United States Patent
Heilig

[11] Patent Number: 5,971,428
[45] Date of Patent: Oct. 26, 1999

[54] VEHICLE STEERING WHEEL FOR EQUIPMENT WITH AN INTEGRATED GAS BAG RESTRAINT SYSTEM

[75] Inventor: Alexander Heilig, Wissgoldingen, Germany

[73] Assignee: TRW Occupant Restraint Systems GmbH, Alfdorf, Germany

[21] Appl. No.: 08/820,143

[22] Filed: Mar. 19, 1997

[30] Foreign Application Priority Data

Mar. 22, 1996 [DE] Germany .............................. 296 05 386

[51] Int. Cl.⁶ .............................. B60R 21/20; B60R 21/22
[52] U.S. Cl. .............................................. 280/731; 74/552
[58] Field of Search .................................. 280/731, 728.3, 280/728.2; 74/552

[56] References Cited

U.S. PATENT DOCUMENTS

| | | | |
|---|---|---|---|
| 5,183,289 | 2/1993 | Zeller et al. | 280/728.3 |
| 5,470,099 | 11/1995 | Williams | 280/728.2 |
| 5,560,264 | 10/1996 | Xolin et al. | 280/731 |
| 5,584,503 | 12/1996 | Lutz | 280/731 |
| 5,615,910 | 4/1997 | Margetak et al. | 280/731 |
| 5,636,859 | 6/1997 | Williams et al. | 280/731 |
| 5,647,610 | 7/1997 | Nagata | 280/731 |
| 5,676,396 | 10/1997 | Fohl | 280/731 |
| 5,720,494 | 2/1998 | Hosoi et al. | 280/731 |

FOREIGN PATENT DOCUMENTS

| | | |
|---|---|---|
| 0461276 | 12/1991 | European Pat. Off. . |
| 0655370 | 5/1995 | European Pat. Off. . |
| 4429214 | 2/1996 | Germany . |
| 3-16554 | 2/1991 | Japan . |
| 3-235738 | 10/1991 | Japan ................................. 280/728.3 |
| 5-38994 | 2/1993 | Japan ................................. 280/728.3 |
| 5-14787 | 6/1993 | Japan . |
| 6-18109 | 3/1994 | Japan . |
| 6-107102 | 4/1994 | Japan . |
| 6-37013 | 5/1994 | Japan . |
| 8-40282 | 2/1996 | Japan . |

Primary Examiner—Peter C. English
Attorney, Agent, or Firm—Tarolli, Sundheim, Covell Tummino & Szabo

[57] ABSTRACT

A vehicle steering wheel for equipment with an integrated gas bag restraint system includes a foam-sheathed steering wheel body. The hub part of which comprises a rear-side cavity for receiving a folded gas bag together with a pressurized gas source. A face cover which is a component of the foamed sheathing of the steering wheel body comprises a foam-sheated strengthening structure integrally connected to the hub part.

10 Claims, 4 Drawing Sheets

VEHICLE STEERING WHEEL FOR EQUIPMENT WITH AN INTEGRATED GAS BAG RESTRAINT SYSTEM

TECHNICAL FIELD

The invention relates to a vehicle steering wheel for equipment with an integrated gas bag restraint system.

BACKGROUND OF THE INVENTION

From DE 44 23 963 A1 a vehicle steering wheel is already known which has a simple configuration since the face cover for the gas bag module insertable in the hollow hub part is an integral component of the foamed sheathing of the steering wheel body, thus eliminating the need for separate manufacture and assembly of the cover.

BRIEF DESCRIPTION OF THE INVENTION

The invention provides a vehicle steering wheel with a cover for the gas bag module which is no longer able to completely tear off on deployment of the gas bag but it merely opens and is deformed in a manner which can be better predetermined. The vehicle steering wheel is adapted to be equipped with an integrated gas bag restraint system which comprises a folded gas bag together with a pressurized gas source. The vehicle steering wheel according to the invention includes a steering wheel body having a hub part with a front and a rear side, and a face cover at the front side of the hub part which has a strengthening structure integrally connected to the hub part. Furthermore, the steering wheel comprises a foam sheathing covering the wheel body and the strengthening structure. The hub part and the face cover define a cavity which has an opening at the rear side of the hub part for receiving the folded gas bag together with the pressurized gas source. Since the strengthening structure is integrally connected to the hub part, additional reinforcements are not necessary. Due to this configuration, a strengthening structure may be provided in the cover by simple and cost-effective means. Although the vehicle steering wheel disclosed in DE 44 23 963 A1 is also provided with a strengthening structure this structure is, however, not connected to the steering wheel body, it instead being inserted in the foamed sheathing. However, having to fully foam-sheath a body which is not connected to other parts requires more effort since the body needs to be held locked in position during foam sheathing on the one hand and, on the other, the holding means required for this purpose must be later removed to ensure complete foam sheathing. Possible recycling of the vehicle steering wheel according to the invention is very simple since, on the one hand, no additional differing materials are introduced into the vehicle steering wheel with the strengthening structure and, on the other, fewer parts to be separated from each other are contained in the vehicle steering wheel according to the invention.

The strengthening structure is preferably cast together with the steering wheel body and comprises at least one slot resulting in a defined bending open of the strengthening structure together with the foamed sheathing when the gas bag deploys.

In accordance with a preferred embodiment, the strengthening structure features a U-shaped cross-section, the cross spar being longitudinally slotted and the legs being connected to the hub part, thus resulting in two flap-like parts which are bent outwardly on deployment of the gas bag and permit bursting of the cover in the region of the longitudinal slot.

In accordance with a further embodiment, the strengthening structure comprises at least one weakened zone resulting in a defined bending open of the strengthening structure on deployment of the gas bag, thus enabling bending open or break locations of the strengthening structure to be predetermined.

The strengthening structure in accordance with the preferred embodiment is faced with raised contours to permit even better predetermination of cover bursting. These contours may be protruding cutting edges and/or protruding pressure points. The cutting edges are preferably oriented along the at least one slot on opposing sides of the strengthening structure to achieve best-possible definition of cover tearing on deployment of the gas bag and on subsequent bending open of the strengthening structure. In addition to this, the force needed to tear the cover is thereby greatly reduced.

When, in accordance with a further embodiment, the strengthening structure comprises openings it is better connected to the foamed sheathing surrounding it.

Figure 1:
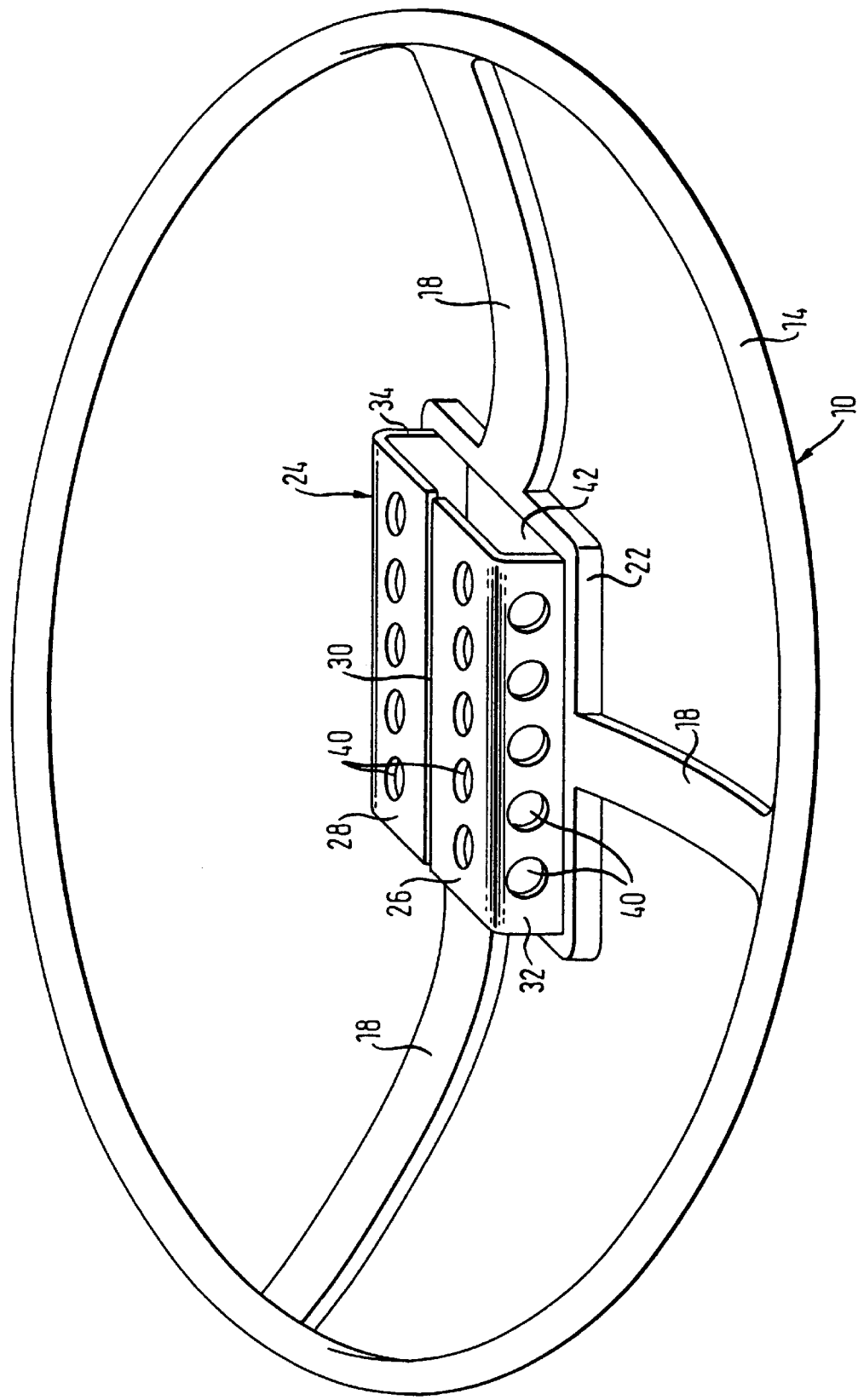
FIG. 1 is a perspective view of one embodiment of the vehicle steering wheel according to the invention prior to being foam-sheathed.
Figure 4:
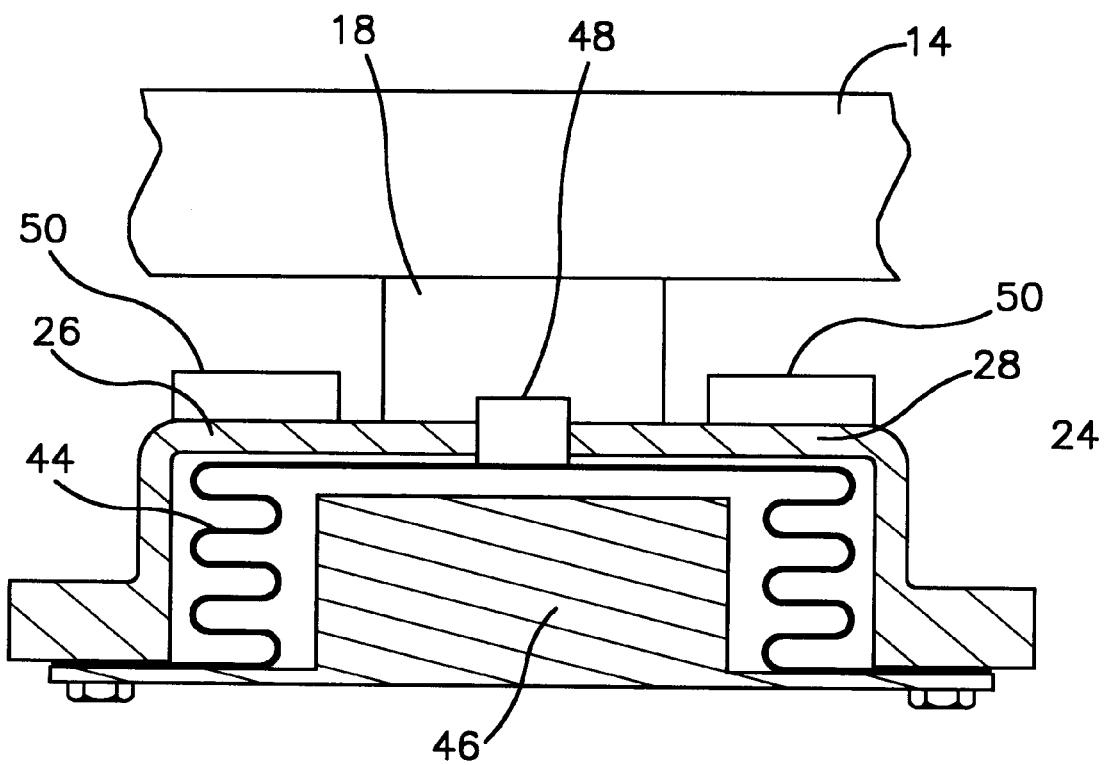
FIG. 4 is a cross-sectional view of a third embodiment of the vehicle steering wheel according to the invention.

A vehicle steering wheel comprises a steering wheel body 10 shown in FIG. 1 including a steering wheel rim 14 and a central, rectangular hub part 22 connected to the latter by three spokes 18. The hub part 22 has a rear-side cavity, the opening of which is rimmed by an annular abutment surface via which the hub part 22 can be connected to a steering shaft (not shown). Cast to the face of the hub part 22 is a strengthening structure 24 protruding upwardly. The strengthening structure 24 has a U-shaped cross-section, one cross spar being provided with a full-length, center slot 30 so that two flap-like parts are formed, each of which consisting of a leg 32, 34 connnected to the hub part 22 and a bowed part 26, 28 of the cross spar adjoining the leg 32, 34 roughly at right angles thereto. Due to the strengthening structure 24 a chamber 42 into which a gas bag module consisting of a folded gas bag 44 together with a pressurized gas source 46, shown schematically in FIG. 4, is insertable is defined which is open to the rear of the hub part 22 and partly open on the sides.

The steering wheel body 10 is preferably a diecast part of aluminum or magnesium. A steering wheel body 10 of a glass-fiber reinforced plastics material is also contemplated.

Figure 2:
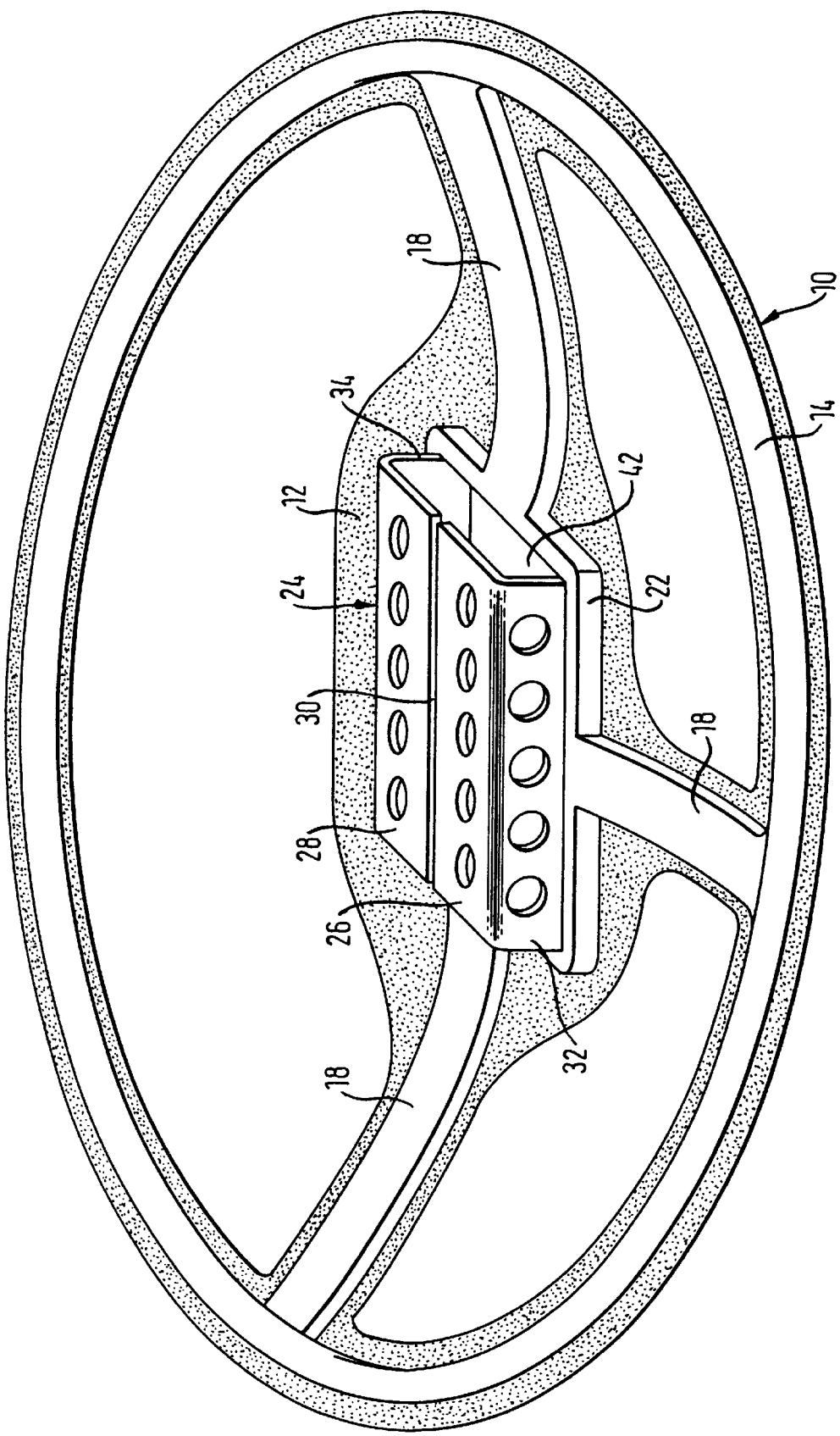
FIG. 2 shows the vehicle steering wheel of FIG. 1 partly foam-sheathed.

The steering wheel body 10 shown in FIG. 1 is provided with a foamed sheathing 12 of plastics as indicated in FIG. 2, the part of the foamed sheathing 12 surrounding the strengthening structure 24 and the hub part 22 on the face having been omitted. The foamed sheathing extends through openings 40 in the strengthening structure 24 provided both in legs 32, 34 and in the parts 26 and 28 of the cross spar up the interior of the chamber 42 where it envelopes the strengthening structure 24 and the hub part 22, thus resulting in a face cover of the gas bag module inserted in the vehicle steering wheel which consists of the foamed sheathing reinforced by the strengthening structure 24.

On deployment of the gas bag the parts 26, 28 are bent outwardly and the foamed sheathing tears in the region of the slot 30 to allow the gas bag to fully deploy towards the vehicle occupant. To facilitate bending open of the strengthening structure 24 these regions may be provided with a reduced cross-section. In addition to this, a longitudinal groove shown as a black box 48 in FIG. 4, instead of the slot 30 may also be provided, the groove producing a reduced cross-section to define a designed weak point which is also possible e.g. by a perforation.

Figure 3:
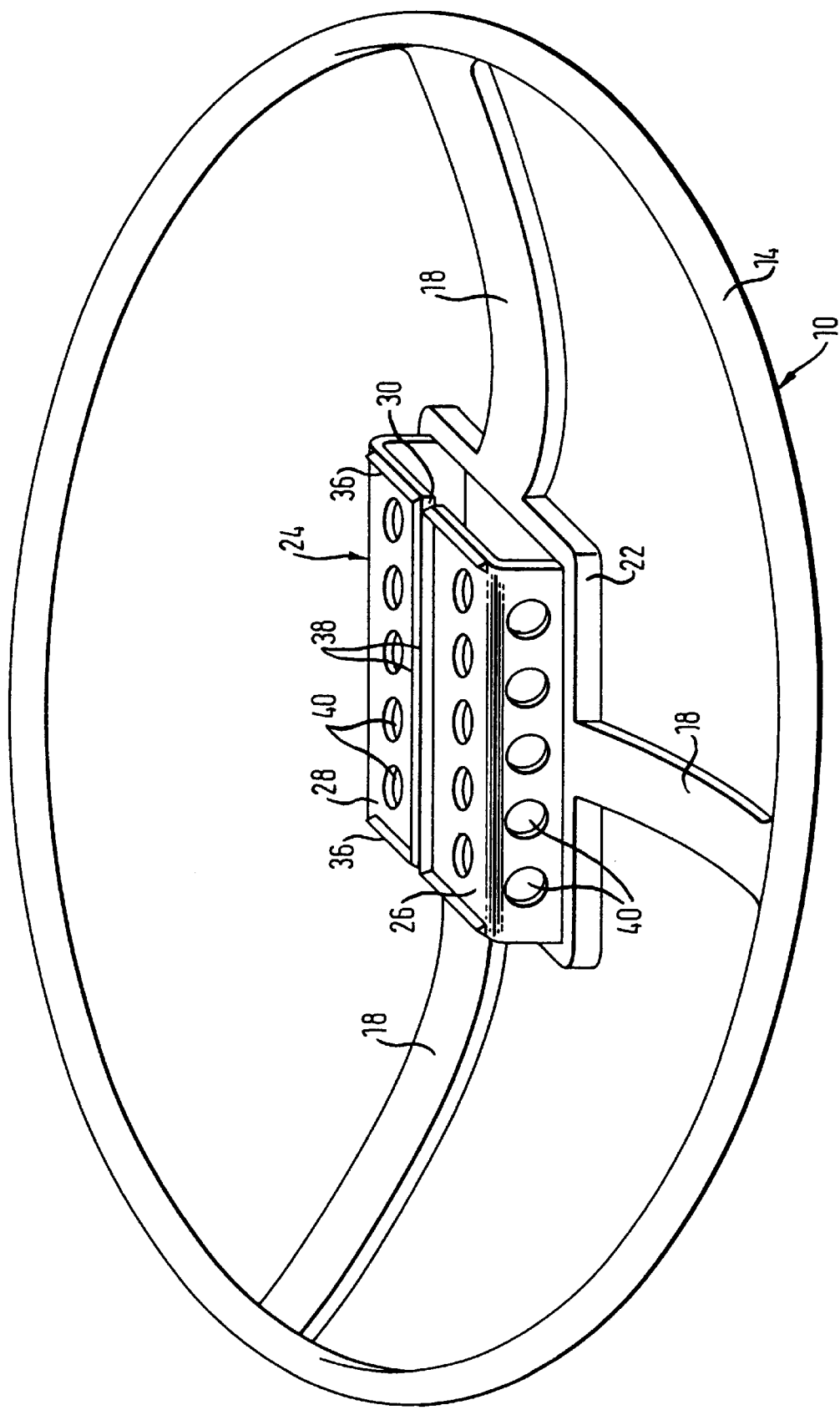
FIG. 3 is a perspective view of a second embodiment of the vehicle steering wheel according to the invention prior to being foam-sheathed.

The second embodiment of the vehicle steering wheel shown in FIG. 3 includes a steering wheel body 10 substantially corresponding to that shown in FIG. 1, but including raised contours in the form of cutting edges 36, 38 having a triangular cross-section on the face of the strengthening structure 24. These cutting edges 36, 38 extend along each of the free edges of the strengthening structure on the upper side of the parts 26, 28. Particularly the cutting edges 38 oriented on both sides of and along the slot 30 define an important bursting line since they cut open the foamed sheathing on deployment of the gas bag. Opening of the cover is better controlled by the cutting edges 36, 38, thus making bursting away of the complete cover impossible. In addition to this, the cutting edges 36, 38 necessitate less force in tearing the cover which results in faster deployment of the gas bag.

Instead of the cutting edges 36, 38, or in addition thereto, raised pressure points shown as black boxes 50 in FIG. 4, may be provided on the parts 26, 28, such points facilitating tearing the cover due to a force being introduced into the cover at a defined location. FIG. 4 also schematically illustrates the gas bag 44, the gas source 46, and the groove or weakened zone 48.

Although the embodiment shown in FIGS. 1 to 3 depict a rectangular hub part 22, on the longitudinal sides of which the flap-like halves of the legs 32, 34 comprising strengthening structure 24 and the parts 26, 28 are cast in-place, hub parts 22 having other geometrical shapes may be provided. If, for instance, the hub part 22 has the shape of a circular ring, a pot-like strengthening structure may be provided comprising several slots in the region of the face and of the sleeve surfaces so that the cover tears star-shaped on deployment of the gas bag.

Having described the invention, I claim:

1. A vehicle steering wheel for equipment with an integrated gas bag restraint system which comprises a folded gas bag together with a pressurized gas source, said steering wheel including a steering wheel body having a hub part with a front and a rear side, a face cover at said front side of said hub part which face cover has a strengthening structure, said strengthening structure together with said hub part comprising a single piece, and a foam sheathing which covers said wheel body and said strengthening structure, said hub part and said face cover defining a cavity having an opening at said rear side of said hub part for receiving said folded gas bag together with said pressurized gas source, said strengthening structure comprising at least one slot resulting in a defined bending open of said strengthening structure on deployment of said gas bag.

2. The vehicle steering wheel as set forth in claim 1, wherein said strengthening structure has a front face with raised contours for a defined tearing of said cover.

3. The vehicle steering wheel as set forth in claim 1 wherein said strengthening structure has opposing sides along said slot and a front face with protruding cutting edges oriented along said slot on said opposing sides for a defined tearing of said cover.

4. The vehicle steering wheel as set forth in claim 3, wherein said strengthening structure has free edges on which said cutting edges are provided.

5. A vehicle steering wheel for equipment with an integrated gas bag restraint system which comprises a folded gas bag together with a pressurized gas source, said steering wheel including a steering wheel body having a hub part with a front and a rear side, a face cover at said front side of said hub part which face cover has a strengthening structure, said strengthening structure together with said hub part comprising a single piece, and a foam sheathing which covers said wheel body and said strengthening structure, said hub part and said face cover defining a cavity having an opening at said rear side of said hub part for receiving said folded gas bag together with said pressurized gas source, said strengthening structure having a U-shaped cross-section and including a longitudinally slotted cross spar and legs connected to said hub part.

6. A vehicle steering wheel for equipment with an integrated gas bag restraint system which comprises a folded gas bag together with a pressurized gas source, said steering wheel including a steering wheel body having a hub part with a front and a rear side, a face cover at said front side of said hub part which face cover has a strengthening structure, said strengthening structure together with said hub part comprising a single piece, and a foam sheathing which covers said wheel body and said strengthening structure, said hub part and said face cover defining a cavity having an opening at said rear side of said hub part for receiving said folded gas bag together with said pressurized gas source, said strengthening structure comprising at least one weakened zone resulting in a defined bending open of said strengthening structure on deployment of said gas bag.

7. A vehicle steering wheel for equipment with an integrated gas bag restraint system which comprises a folded gas bag together with a pressurized gas source, said steering wheel including a steering wheel body having a hub part with a front and a rear side, a face cover at said front side of said hub part which face cover has a strengthening structure, said strengthening structure together with said hub part comprising a single piece, and a foam sheathing which covers said wheel body and said strengthening structure, said hub part and said face cover defining a cavity having an opening at said rear side of said hub part for receiving said folded gas bag together with said pressurized gas source, said strengthening structure having a front face with raised contours for a defined tearing of said cover.

8. The vehicle steering wheel as set forth in claim 7, wherein said contours comprise protruding cutting edges.

9. The vehicle steering wheel as set forth in claim 8, wherein said contours comprise protruding pressure points.

10. The vehicle steering wheel as set forth in claim 7, wherein said contours are protruding pressure points.

\* \* \* \* \*